(12) United States Patent
Lin et al.

(10) Patent No.: US 11,323,675 B2
(45) Date of Patent: May 3, 2022

(54) METHOD FOR GENERATING MASK, AND PROJECTION APPARATUS FOR PERFORMING THE SAME

(71) Applicant: Coretronic Corporation, Hsin-Chu (TW)

(72) Inventors: Chi-Wei Lin, Hsin-Chu (TW); Chien-Chun Peng, Hsin-Chu (TW); Hsun-Cheng Tu, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 17/216,690

(22) Filed: Mar. 30, 2021

(65) Prior Publication Data

US 2021/0377500 A1    Dec. 2, 2021

(30) Foreign Application Priority Data

May 29, 2020    (CN) .......................... 202010475157.5

(51) Int. Cl.
*H04N 9/31*     (2006.01)
*G06T 7/64*     (2017.01)

(52) U.S. Cl.
CPC ............. *H04N 9/3185* (2013.01); *G06T 7/64* (2017.01)

(58) Field of Classification Search
CPC ...... H04N 9/3185; H04N 9/3194; G06T 7/64; G06T 2207/10152; G06T 5/006
See application file for complete search history.

(56) References Cited

U.S. PATENT DOCUMENTS 6,317,198 B1    11/2001 Sato et al.
8,154,586 B2 *   4/2012 Li .......................... H04N 5/74
                                                  348/42
(Continued)

FOREIGN PATENT DOCUMENTS

CN    101697056    4/2010
CN    106162125    11/2016
(Continued)

OTHER PUBLICATIONS

"Office Action of Taiwan Counterpart Application", dated Jul. 7, 2021, p. 1-p. 3.

*Primary Examiner* — John W Miller
*Assistant Examiner* — Humam M Satti
(74) *Attorney, Agent, or Firm* — JCIPRNET

(57) ABSTRACT

A method for generating a mask and a projection apparatus for performing the method are provided. The method includes: projecting a first pattern onto a projection surface, wherein the projection surface includes a non-planar region, and the first pattern includes multiple first straight lines; shooting a first image of the projection surface on which the first pattern is rendered; finding at least one first specific line segment in the first image, wherein each first specific line segment includes at least one first inflection point; delineating a first contour based on the at least one first inflection point in a case of determining that the at least one first inflection point in the first image is suitable for delineating the first contour; and generating a first mask pattern based on the first contour in a case of determining that the first contour matches a region contour of the non-planar region.

22 Claims, 9 Drawing Sheets

(56) References Cited

U.S. PATENT DOCUMENTS

| | | | |
|---|---|---|---|
| 2006/0140504 A1* | 6/2006 | Fujimoto | G06T 3/0031 |
| | | | 382/275 |
| 2014/0139751 A1* | 5/2014 | Narikawa | H04N 9/3185 |
| | | | 348/789 |
| 2015/0178903 A1* | 6/2015 | Maeno | G06T 5/006 |
| | | | 382/275 |
| 2018/0167593 A1* | 6/2018 | Narikawa | G09G 5/38 |
| 2019/0149786 A1* | 5/2019 | Peng | H04N 9/3188 |
| | | | 348/136 |

FOREIGN PATENT DOCUMENTS

| | | | | |
|---|---|---|---|---|
| CN | 110213553 A | * | 9/2019 | |
| TW | 201640234 | | 11/2016 | |
| TW | I616100 | | 2/2018 | |
| WO | WO-2011051281 A1 | * | 5/2011 | H04N 9/3182 |

* cited by examiner

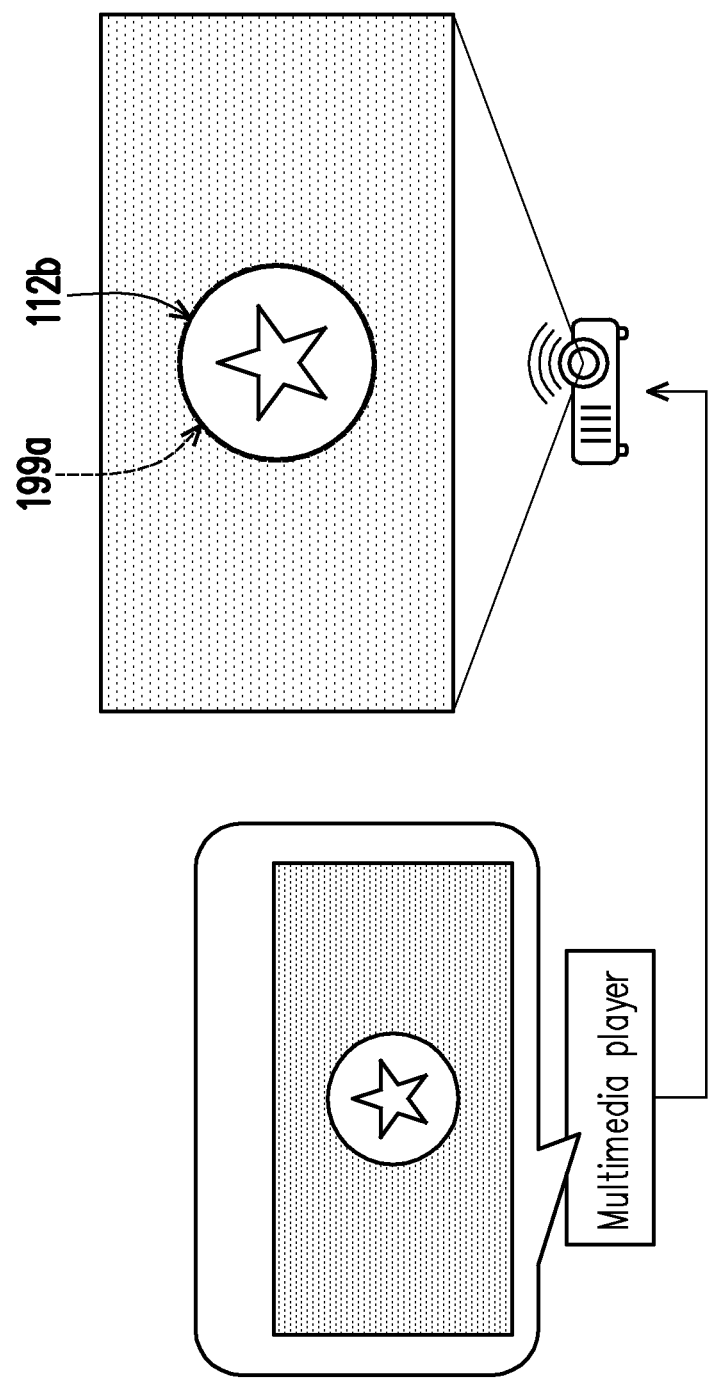

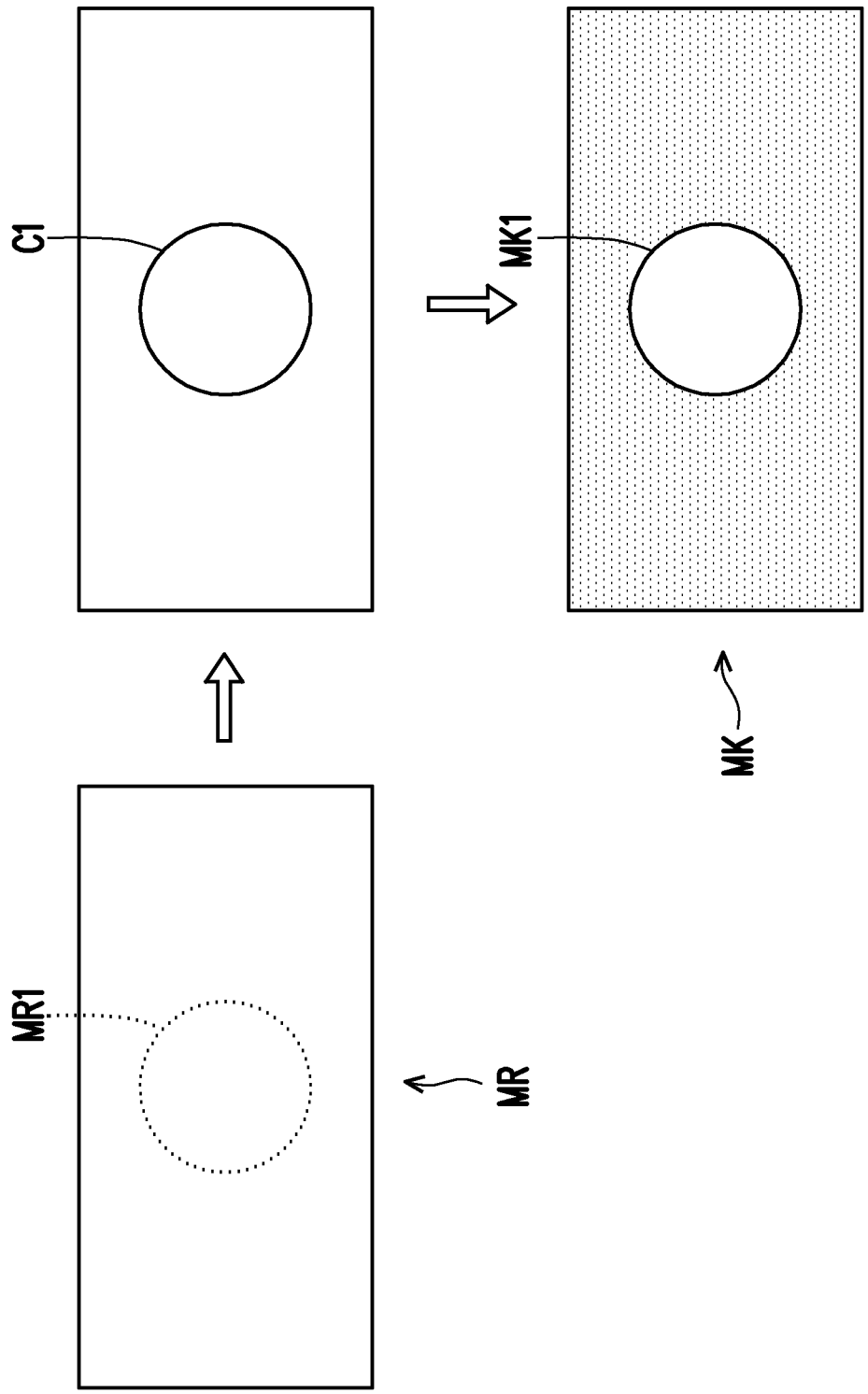

METHOD FOR GENERATING MASK, AND PROJECTION APPARATUS FOR PERFORMING THE SAME

CROSS-REFERENCE TO RELATED APPLICATION

This application claims the priority benefit of China application serial no. 202010475157.5, filed on May 29, 2020. The entirety of the above-mentioned patent application is hereby incorporated by reference herein and made a part of this specification.

BACKGROUND OF THE INVENTION

1. Field of the Invention

The invention relates to a projection technology, and in particular, to a method for generating a mask, and a projection apparatus.

2. Description of Related Art

In the prior art, a projection apparatus may use an image masking function to project an image onto a projection surface that includes a non-planar region (such as a convex surface, a concave surface, or a combination thereof) so that projection content is rendered in the non-planar region only. Generally, the image masking function performed by the projection apparatus is implemented by setting parts in the projection content that are not corresponding to the non-planar region to black screens, so that only the part corresponding to the non-planar region is retained in the projection content. However, after the projection apparatus projects the image-masked projection content onto the projection surface, a user often needs to manually adjust relevant projection apparatus parameters (such as size and position of a projected screen, and the like) to correctly render the projection content within the non-planar region.

Refer to FIG. 1A to FIG. 1D, which show a mechanism for projecting masked projection content onto a projection surface including a non-planar region in the prior art.

In FIG. 1A, it is assumed that a projection surface 199 includes a non-planar region 199a. As can be seen from a side view of the projection surface 199, the non-planar region 199a is, for example, a circular convex surface. A multimedia player 110 includes projection content 112. In addition, it is assumed that the multimedia player 110 connected to a projection apparatus 100 intends to project the projection content 112 onto the projection surface 199 through the projection apparatus 100, wherein the projection content 112 may include a masked region 112a and an unmasked region 112b corresponding to the non-planar region 199a.

However, as can be seen from FIG. 1B, after the projection apparatus 100 projects the projection content 112 onto the projection surface 199, the unmasked region 112b cannot be correctly rendered in the non-planar region 199a due to unevenness of the non-planar region 199a. In this case, the user may deform the projected screen by means such as adjusting related projection parameters of the projection apparatus 100 in order to correctly render the unmasked region 112b in the non-planar region 199a, as shown in FIG. 1C.

After some adjustments, the unmasked region 112b may be correctly rendered in the non-planar region 199a, as shown in FIG. 1D.

However, the above method is not convenient for the user to operate. In addition, in a case that the unmasked region 112b in the projected screen is smaller than the non-planar region 199a, the user cannot deform the projected screen through the manner shown in FIG. 1C. If the positions of the masked region 112a and the non-masked region 112b cannot be adjusted, the unmasked region 112b cannot be correctly rendered in the non-planar region 199a unless the projection content 112 is re-created.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY OF THE INVENTION

The invention provides a method for generating a mask, and a projection apparatus, to adaptively generate a corresponding mask pattern according to a region contour of a non-planar region.

Other objectives and advantages of the invention can be further understood from the technical features disclosed in the invention.

The invention provides a method for generating a mask, applied to a projection apparatus, the method includes the following steps. A first pattern is projected onto a projection surface, wherein the projection surface includes a non-planar region, and the first pattern includes multiple first straight lines. A first image of the projection surface on which the first pattern is rendered is shot. At least one first specific line segment in the first image is found, wherein each first specific line segment includes at least one first inflection point. A first contour is delineated based on the at least one first inflection point in a case of determining that the at least one first inflection point in the first image is suitable for delineating the first contour. A first mask pattern is generated based on the first contour in a case of determining that the first contour matches a region contour of the non-planar region, wherein the first mask pattern is configured to mask an outer region of the first contour.

The invention provides a projection apparatus, including a storage circuit, a projection circuit, an imaging circuit, and a processor. The storage circuit stores multiple modules. The processor is coupled to the storage circuit, the projection circuit, and the imaging circuit, and accesses the modules. The processor controls the projection circuit to project a first pattern onto a projection surface, wherein the projection surface includes a non-planar region, and the first pattern includes multiple first straight lines. The processor controls the imaging circuit to shoot a first image of the projection surface on which the first pattern is rendered. The processor controls the modules to find at least one first specific line segment in the first image, wherein each first specific line segment includes at least one first inflection point. The processor controls the modules to delineate a first contour based on the at least one first inflection point in a case of determining that the at least one first inflection point in the first image is suitable for delineating the first contour. The processor controls the modules to generate a first mask pattern based on the first contour in a case of determining that the first contour matches a region contour of the non-planar region. The first mask pattern is configured to mask an outer region of the first contour.

Based on the foregoing, according to the method and the projection apparatus in the invention, after one or more patterns are projected onto the projection surface including the non-planar region, a contour corresponding to the region contour of the non-planar region can be delineated based on the inflection points of the patterns caused by the non-planar region, and a corresponding mask pattern is generated accordingly. The mask pattern may be configured to mask an outer region of the contour. That is, the projection apparatus in the invention can adaptively generate a corresponding mask pattern according to the region contour of the non-planar region, so that the unmasked region in the projection content can be correctly rendered in the non-planar region.

In order to make the foregoing features and advantages of the invention comprehensible, embodiments accompanied with figures are described in detail below.

Other objectives, features and advantages of the invention will be further understood from the further technological features disclosed by the embodiments of the invention wherein there are shown and described exemplary embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 1A to FIG. 1D show a mechanism for projecting masked projection content onto a projection surface including a non-planar region in the prior art.

FIG. 3C is a schematic diagram of a reference image according to FIG. 3A and FIG. 3B.

DESCRIPTION OF THE EMBODIMENTS

It is to be understood that other embodiment may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

The foregoing and other technical content, characteristics, and effects of the invention may be clearly presented in the following detailed description of an exemplary embodiment, which matches the accompany drawings. The directional terms mentioned in the following embodiments, such as "above," "below," "left," "right," "front," or "back," refer to the directions in the accompanying drawings. Therefore, the directional terms are only used for illustration instead of limiting the invention.

Figure 2:
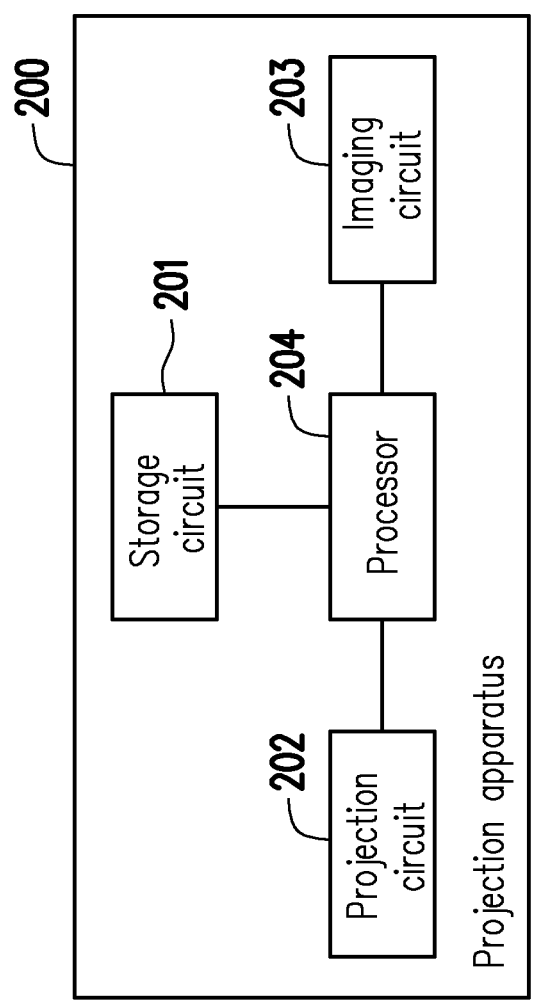
FIG. 2 is a schematic diagram of a projection apparatus according to an embodiment of the invention.

Refer to FIG. 2, which is a schematic diagram of a projection apparatus according to an embodiment of the invention. As shown in FIG. 2, the projection apparatus 200 includes a storage circuit 201, a projection circuit 202, an imaging circuit 203, and a processor 204.

The storage circuit 201 is, for example, any type of fixed or mobile random access memory (RAM), read-only memory (ROM), flash memory, hard disk, or other similar apparatuses, or a combination thereof, and may be configured to store multiple modules such as multiple pieces of code or software.

The projection circuit 202 is configured to control a projection module (not shown). The projection module may include a light valve, a focus lens, a light source, and the like, and may be configured to, but not limited to, project projection content or a specified pattern. The imaging circuit 203 is, for example, configured to control a charge coupled device (CCD) lens and/or a complementary metal oxide semiconductor transistor (CMOS) lens, and may be configured to, but not limited to, capture an image.

The processor 204 is coupled to the storage circuit 201, the projection circuit 202, and the imaging circuit 203, and may serve as a general-purpose processor, a special-purpose processor, a digital signal processor, a microprocessor, or one or more microprocessors that integrate a digital signal processor core, a controller, a microcontroller, an application specific integrated circuit (ASIC), a field programmable gate array (FPGA), any other type of integrated circuit, a state machine, a processor based on advanced RISC machine (ARM), or a similar product.

To be brief, referring to FIG. 2 and FIG. 3A to FIG. 3C, the projection apparatus 200 in the invention may shoot/capture an image of the projection surface 199 after projecting a pattern in a specific form (for example, multiple straight lines) onto the projection surface 199, and then attempt to construct/delineate a contour of the non-planar region 199a according to inflection points of the line segments of the pattern in the image. In addition, if the delineated contour is determined as consistent with the region contour of the non-planar region 199a, the projection apparatus 200 may generate a mask pattern accordingly. The mask pattern may be configured to mask an outer region of the contour. In other words, an unmasked region in the mask pattern corresponds to the non-planar region 199a.

On the other hand, if the projection apparatus 200 cannot successfully construct/delineate the contour of the non-planar region 199a, or if the delineated contour is determined as not consistent with the region contour of the non-planar region 199a, the projection apparatus 200 may project one or more other patterns to construct/delineate the contour of the non-planar region 199a and generate a corresponding mask pattern.

To make the concept of the invention easier to understand, the following gives a further description with reference to FIG. 2 and FIG. 3A to FIG. 3C. However, the description is only used as an example, and is not intended to limit possible implementations of the invention.

Figure 1A:
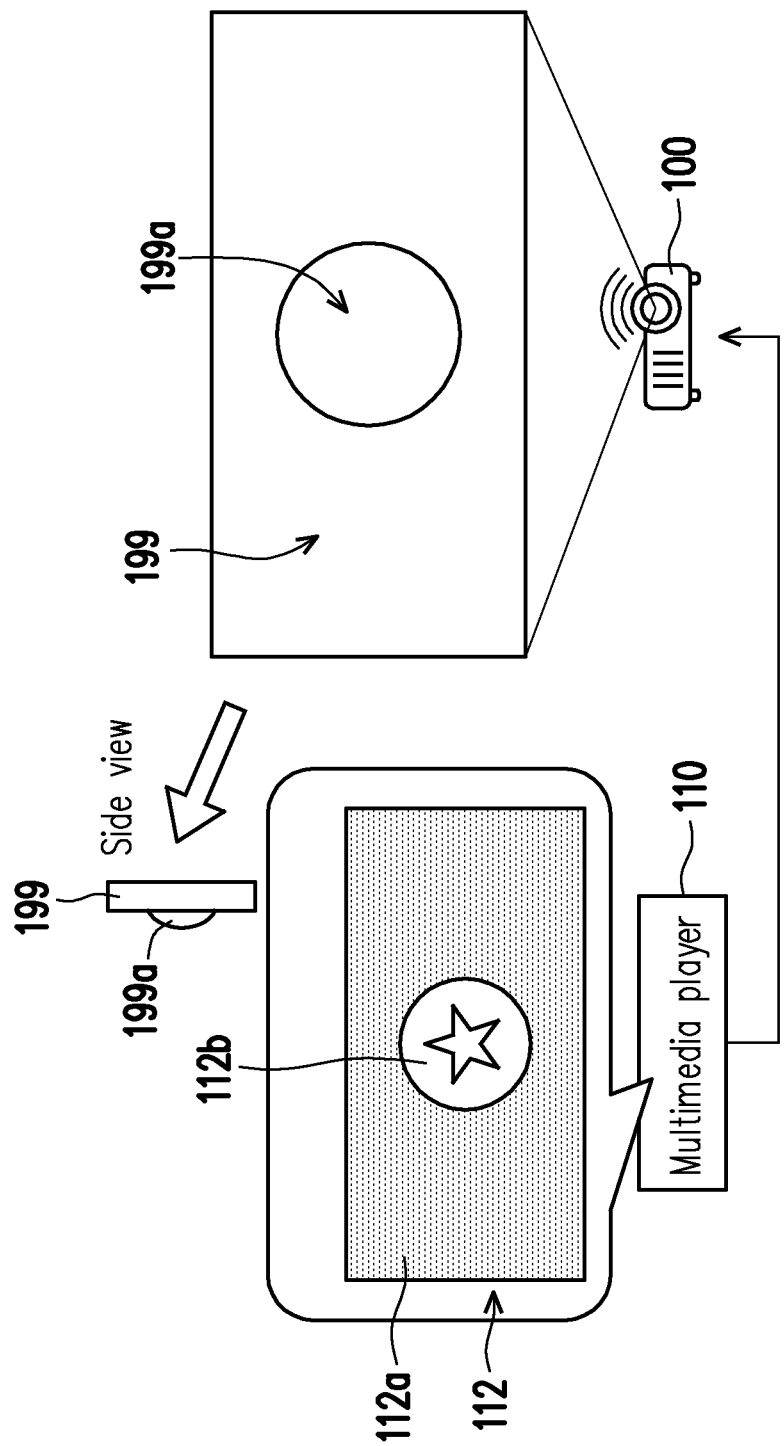
Figure 1B:
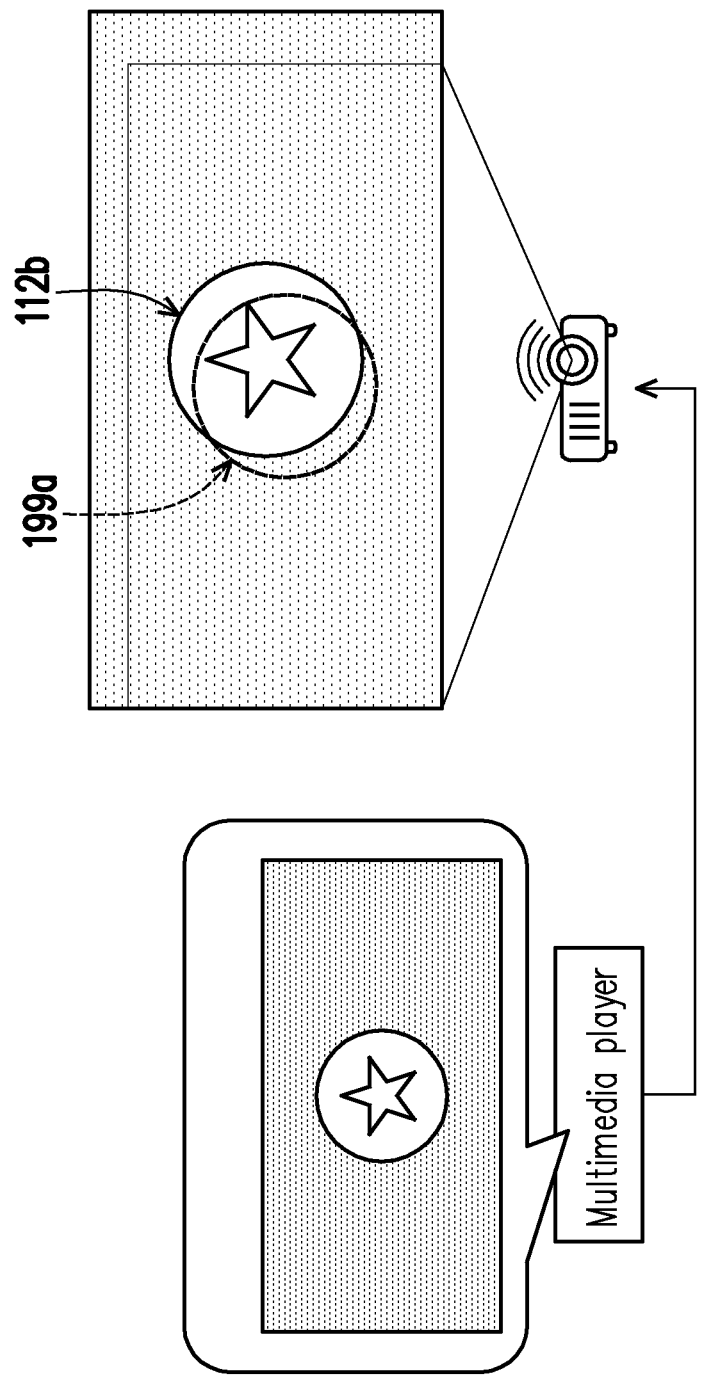
Figure 1C:
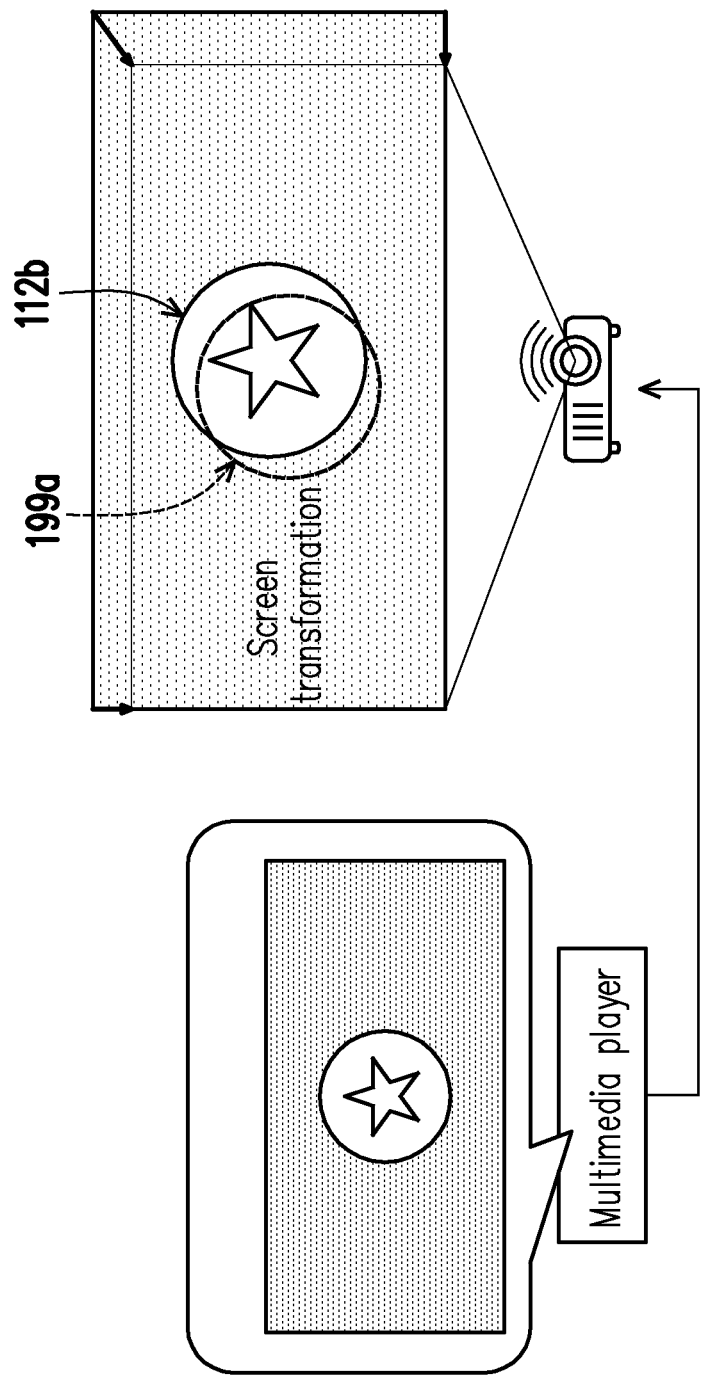
Figure 3A:
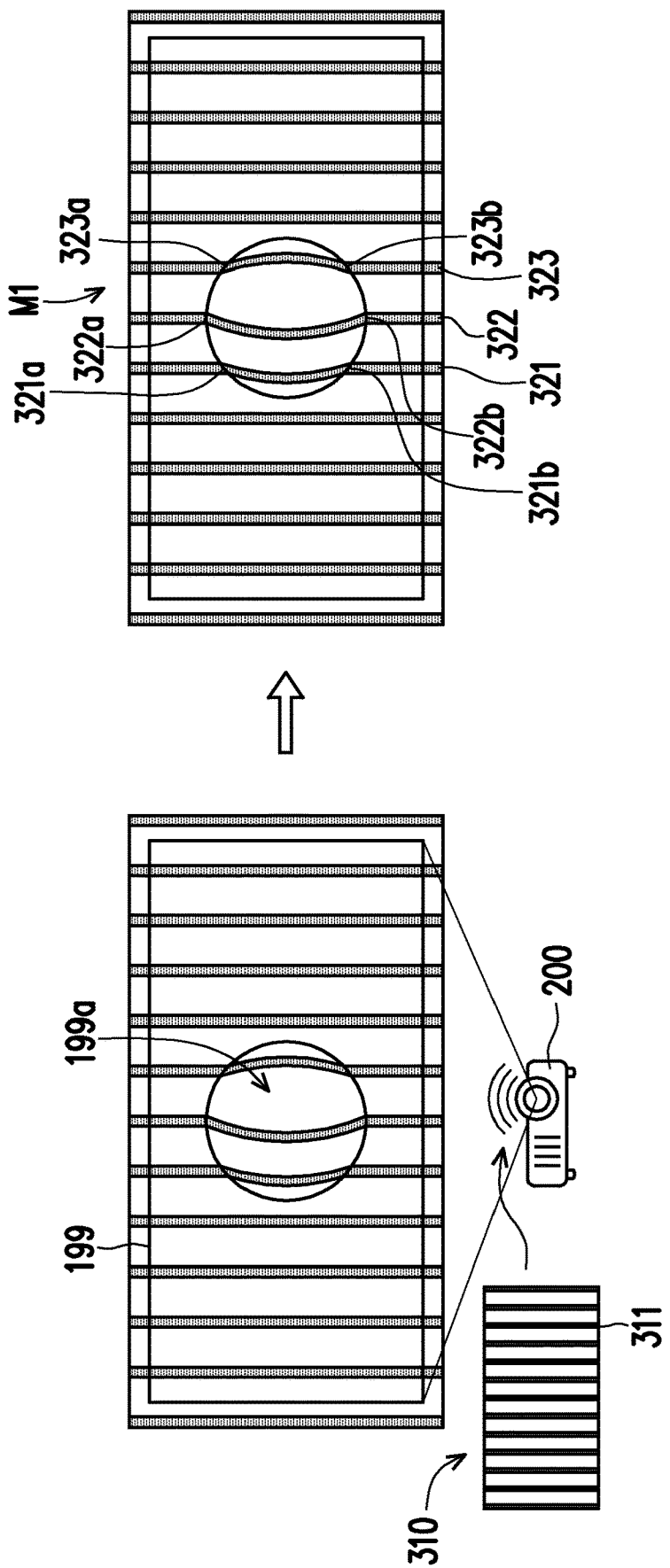
FIG. 3A is a schematic diagram of projecting a first pattern onto a projection surface according to an embodiment of the invention.

Refer to FIG. 3A, which is a schematic diagram of projecting a first pattern onto a projection surface according to an embodiment of the invention. In this embodiment, the projection apparatus 200 may control the projection circuit 202 through the processor 204 to project a first pattern 310 onto the projection surface 199 including the non-planar region 199a. The first pattern 310 may include multiple first straight lines 311, and the first straight lines 311 may be parallel to each other. In addition, for the form of the non-planar region 199a on the projection surface 199, refer to the side view shown in FIG. 1A.

As shown in FIG. 3A, after the first pattern 310 is projected onto the projection surface 199, some straight lines in the first pattern 310 will have inflection points due to the non-planar region 199a. For ease of description, a first straight line 311 that has inflection points due to the non-planar region 199a is referred to as a first specific line segment, but is not limited thereto. Subsequently, the projection apparatus 200 may control the imaging circuit 203 through the processor 204 to shoot a first image M1 of the projection surface 199 on which the first pattern 310 is rendered, and may control, through the processor 204, a module stored in the storage circuit 201 to find the first specific line segment in the first image M1.

In an embodiment, the projection apparatus 200 may find the first specific line segment based on a change of a slope/curvature of each first straight line 311 in the first image M1. Specifically, in the first pattern 310, a first preset slope may be set for each first straight line 311. The projection apparatus 200 may find, in the first image M1, one or more line segments whose slopes are not equal to the first preset slope, and use the one or more line segments as the first specific line segment. From another point of view, each found first specific line segment may be regarded as having a specific slope, and the specific slope may be different from the first preset slope. In addition, in some embodiments, the first specific line segment may include a curve, and therefore, may include multiple different specific slopes, but this does not constitute any limitation.

In addition, each first straight line 311 may also be understood as having a first preset curvature (for example, 0), and each first specific line segment may be regarded as having a specific curvature different from the first preset curvature, but this does not constitute any limitation.

Based on this, in the first image M1, the projection apparatus 200 may accordingly find first specific line segments 321, 322, 323 whose slopes are not equal to the first preset slope (or whose curvatures are not equal to the first preset curvature). The first specific line segments may individually include one or more first inflection points caused by the non-planar region 199a. The first specific line segment 321, for example, may include first inflection points 321a and 321b. The first specific line segment 322, for example, may include first inflection points 322a and 322b. The first specific line segment 323, for example, may include the first inflection points 323a and 323b.

As mentioned above, the first inflection points in the first image M1 may be used for constructing/delineating the contour of the non-planar region 199a. However, in some embodiments, to avoid finding an incorrect inflection point, a related inflection point verification mechanism is also provided in the invention. To be brief, in the inflection point verification mechanism, when the projection apparatus 200 finds a line segment with an inflection point by controlling, through the processor 204, the module stored in the storage circuit 201, the projection apparatus 200 may control, through the processor 204, the module stored in the storage circuit 201 to further determine whether an adjacent line segment of the line segment is also a specific line segment with an inflection point. If the adjacent line segment of the line segment is also a specific line segment with an inflection point, the projection apparatus 200 may confirm that the line segment is a specific line segment. Conversely, if none of the adjacent line segments of the line segment has an inflection point, it means that the inflection point on the line segment may not be a true inflection point, but may be incorrectly determined as an inflection point. Therefore, the projection apparatus 200 may ignore the inflection point on the line segment (that is, the inflection point on the line segment will not be used for delineating the contour of the non-planar region 199a).

Specifically, the first image M1 may be assumed to have multiple reference line segments corresponding to the first straight line 311 in the first pattern 310. In this case, when the projection apparatus 200 controls, through the processor 204, the module stored in the storage circuit 201 to determine that at least one reference inflection point exists on an $i^{th}$ reference line segment (i is an index value of the reference line segment) among the reference line segments, the projection apparatus 200 may control, through the processor 204, the module stored in the storage circuit 201 to further determine whether at least one reference inflection point exists on an $(i-1)^{th}$ reference line segment or an $(i+1)^{th}$ reference line segment among the reference line segments, wherein a reference slope included in each reference line segment is different from the first preset slope. For example, if the first specific line segment 322 is set as the $i^{th}$ reference line segment, the $(i-1)^{th}$ reference line segment may be the first specific line segment 321, and the $(i+1)^{th}$ reference line segment may be the first specific line segment 323.

If the projection apparatus 200 controls, through the processor 204, the module stored in the storage circuit 201 to determine that a reference inflection point exists on the $(i-1)^{th}$ reference line segment or the $(i+1)^{th}$ reference line segment, it may be determined that the $i^{th}$ reference line segment is a first specific line segment, and that at least one reference inflection point on the $i^{th}$ reference line segment is a first inflection point. For example, it is determined that reference inflection points (the first inflection points 321a and 321b) exist on the first specific line segment 321 (the $(i-1)^{th}$ reference line segment), and that reference inflection points (the first inflection points 323a and 323b) exist on the first specific line segment 323 (the $(i+1)^{th}$ reference line segment). Therefore, it may be determined that the first specific line segment 322 (the $i^{th}$ reference line segment) with reference inflection points (the first inflection points 322a and 322b) is a first specific line segment. On the other hand, when the projection apparatus 200 controls, through the processor 204, the module stored in the storage circuit 201 to determine that no reference inflection point exists on the $(i-1)^{th}$ reference line segment and the $(i+1)^{th}$ reference line segment, it may be determined that the $i^{th}$ reference line segment is not a first specific line segment, and that at least one reference inflection point on the $i^{th}$ reference line segment is not a first inflection point. However, the invention is not limited thereto.

After obtaining the first inflection points 321a-323b in the first image M1, the projection apparatus 200 may determine whether the first inflection points 321a-323b are suitable for delineating a first contour.

In some embodiments, if the first inflection points 321a-323b are too small in quantity or too far in distance, the first contour to be delineated subsequently based on the first inflection points may not accurately correspond to the region contour of the non-planar region 199a. Therefore, the projection apparatus 200 may control, through the processor 204, the module stored in the storage circuit 201 to determine whether the quantity of the first inflection points 321a-323b is greater than a preset quantity (for example, 3)

and/or determine whether a distance between every two of the first inflection points 321a-323b exceeds a preset distance, whereby it is determined whether the first inflection points 321a-323b are suitable for delineating the first contour. If the quantity of the first inflection points 321a-323b is smaller than the preset quantity and/or the distance between every two of the first inflection points 321a-323b exceeds the preset distance, the projection apparatus 200 may determine, for example, that the first inflection points 321a-323b are not suitable for delineating the first contour. In this case, as mentioned above, the projection apparatus 200 in the invention may further project one or more other patterns in an attempt to construct/delineate the contour of the non-planar region 199a and generate a corresponding mask pattern, the details of which will be described later.

Conversely, if the quantity of the first inflection points 321a-323b is not smaller than the preset quantity and the distance between every two of the first inflection points 321a-323b does not exceed the preset distance, the projection apparatus 200 may determine, for example, that the first inflection points 321a-323b are suitable for delineating the first contour, but this does not constitute any limitation on the invention.

In FIG. 3A, assuming that the projection apparatus 200 determines that the first inflection points 321a-323b are suitable for delineating the first contour, the projection apparatus 200 may further control, through the processor 204, the module stored in the storage circuit 201 to delineate the first contour based on the first inflection points 321a-323b. In an embodiment, the projection apparatus 200 may connect every two adjacent points in the first inflection points 321a-323b to form a closed line segment, and use the closed line segment as the first contour, but this does not constitute any limitation.

Subsequently, according to the invention, it may be further checked whether the delineated first contour matches the region contour of the non-planar region 199a. In an embodiment, after delineating the first contour, the projection apparatus 200 may determine, through the processor 204, whether an acknowledgement command or non-acknowledgement command is received.

For example, after the projection apparatus 200 delineates the first contour, the projection apparatus 200 may render the first contour to the user for viewing, and simultaneously provide a dialog box asking the user to check whether the first contour matches the region contour of the non-planar region 199a. In this case, the acknowledgement command may be, for example, generated by operating the dialog box after the user visually confirms that the first contour matches the region contour of the non-planar region 199a. In addition, if the user visually confirms that the first contour does not match the region contour of the non-planar region 199a, the user may also generate the non-acknowledgement command by operating the dialog box, but this does not constitute any limitation.

Therefore, in the first embodiment, when the projection apparatus 200 determines, through the processor 204, that an acknowledgement command is received, it may be determined that the first contour matches the region contour of the non-planar region 199a. Subsequently, the projection apparatus 200 may control, through the processor 204, the module stored in the storage circuit 201 to generate a first mask pattern based on the first contour. The first mask pattern may be used for masking the outer region of the first contour. In other words, an unmasked region in the first mask pattern corresponds to the non-planar region 199a. Subsequently, the projection apparatus 200 may control, through the processor 204, the module stored in the storage circuit 201 to obtain projection content, and mask the projection content by using the first mask pattern. In this case, other than the part corresponding to the non-planar region 199a, all the remaining part of the masked projection content is masked. Correspondingly, the projection apparatus 200 may control the projection circuit 202 through the processor 204 to project the masked projection content onto the projection surface 199. As can be seen from the foregoing, the projection apparatus 200 in the invention can adaptively generate a corresponding first mask pattern according to the region contour of the non-planar region 199a, so that an unmasked region in the projection content can be correctly rendered in the non-planar region 199a.

On the other hand, in a second embodiment, when the projection apparatus 200 determines, through the processor 204, that a non-acknowledgement command is received, it may be determined that the first contour does not match the region contour of the non-planar region 199a. Using FIG. 3A as an example, assuming that the user visually determines that the first contour delineated based on the first inflection points 321a-323b does not match the non-planar region 199a, and operates the dialog box correspondingly, the projection apparatus 200 may determine, according to the received non-acknowledgement command, that the first contour does not match the region contour of the non-planar region 199a.

In this case, as mentioned above, the projection apparatus 200 in the invention may further project one or more other patterns in an attempt to construct/delineate the contour of the non-planar region 199a and generate a corresponding mask pattern. Related details will be described with reference to the following third embodiment, fourth embodiment, and fifth embodiment.

Figure 3B:
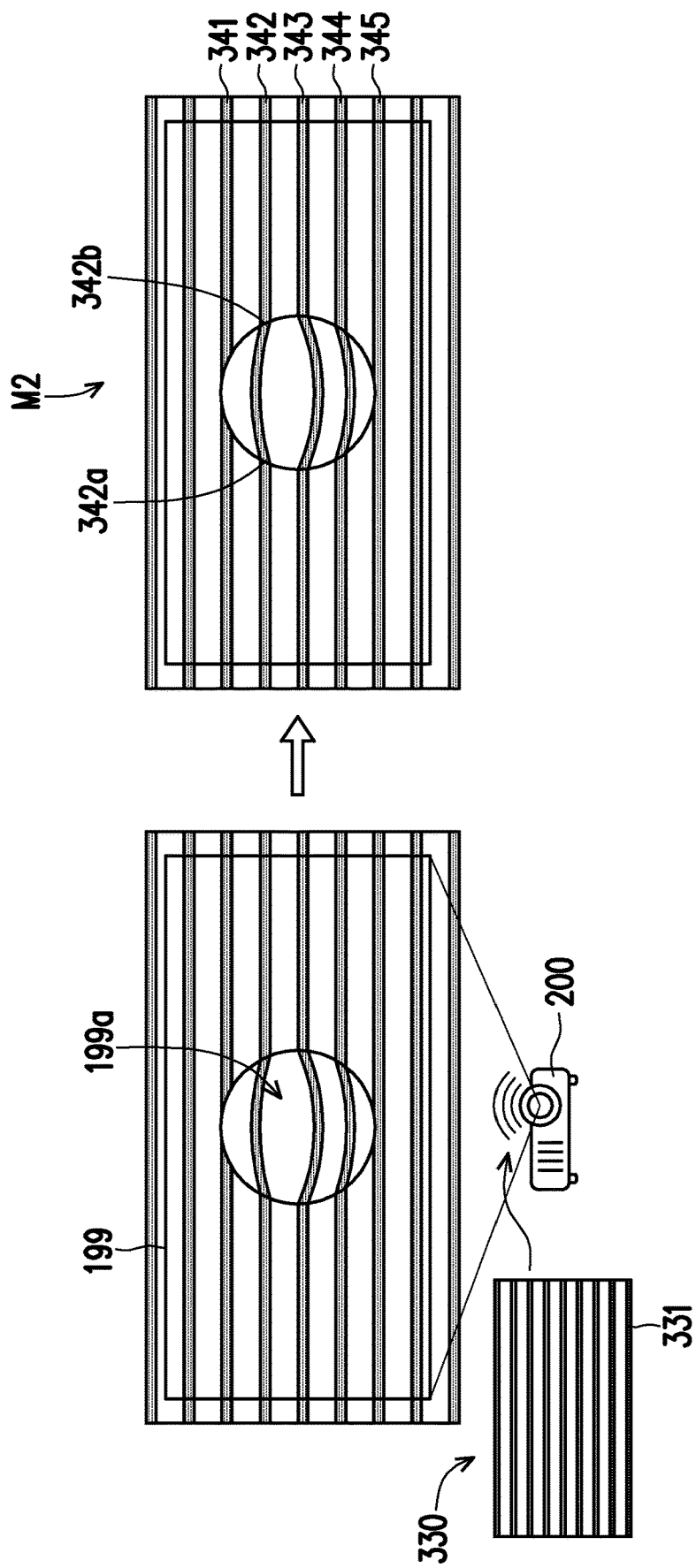
FIG. 3B is a schematic diagram of projecting a second pattern onto a projection surface according to another embodiment of the invention.

Refer to FIG. 3B, which is a schematic diagram of projecting a second pattern onto a projection surface according to another embodiment (the third embodiment) of the invention. In the third embodiment, when the projection apparatus 200 determines that the first inflection points 321a-323b in the first image M1 are not suitable for delineating the first contour, or that the delineated first contour does not match the region contour of the non-planar region 199a, the projection apparatus 200 may stop projecting the first pattern 310 and then control the projection circuit 202 through the processor 204 to project the second pattern 330 onto the projection surface 199. As shown in FIG. 3B, the second pattern 330 may include a plurality of second straight lines 331, and one of the second straight lines 331 is not parallel to one of the first straight lines 311 shown in FIG. 3A. For example, the first straight line 311 in FIG. 3A is, for example, a longitudinal straight line, and the second straight line 331 in FIG. 3B is, for example, a transverse straight line.

Subsequently, the projection apparatus 200 may control the imaging circuit 203 through the processor 204 to shoot a second image M2 of the projection surface 199 on which the second pattern 330 is rendered, and may control, through the processor 204, the module stored in the storage circuit 201 to find at least one second specific line segment in the second image M2. Each second specific line segment includes at least one second inflection point caused by the non-planar region 199a. In this embodiment, a mechanism for the projection apparatus 200 to find the second specific line segment in the second image M2 may be obtained by referring to the mechanism of finding the first specific line segment in the first image M1, and therefore, the details thereof are omitted herein.

In FIG. 3B, it is assumed that the projection apparatus 200 finds the second specific line segments 341-345 in the second image M2, and the second specific line segments may individually include one or more second inflection points. For example, the second specific line segment 342 may include second inflection points 342a and 342b. A person of ordinary skill in the art may be able to deduce the second inflection points in the remaining second specific line segments accordingly. Therefore, the details thereof are omitted herein.

Thereafter, the projection apparatus 200 may determine whether the first inflection points in the first image M1 and the second inflection points in the second image M2 (for example, the second inflection points 342a and 342b) are suitable for delineating the second contour. In an embodiment, the projection apparatus 200 may map the first inflection points in the first image M1 and the second inflection points in the second image M2 onto the same reference image, and then determine whether the first inflection points and the second inflection points are suitable for delineating the second contour.

Refer to FIG. 3C, which is a schematic diagram of a reference image according to FIG. 3A and FIG. 3B. In this embodiment, it is assumed that the projection apparatus 200 may map the first inflection points in the first image M1 and the second inflection points in the second image M2 to the same reference image MR. In this case, the projection apparatus 200 may control, through the processor 204, the module stored in the storage circuit 201 to determine whether the quantity of the first inflection points in the reference image MR and the quantity of the second inflection points in the second image M2 are greater than a preset quantity (for example, 3) and/or determine whether a distance between every two of the first inflection points and the second inflection points exceeds a preset distance, whereby it is determined whether the first inflection points and the second inflection points are suitable for delineating the second contour.

If the quantity of the first inflection points and the second inflection points in the reference image MR is smaller than the preset quantity and/or the distance between every two of the first inflection points and the second inflection points exceeds the preset distance, the projection apparatus 200 may determine, for example, that the first inflection points and the second inflection points are not suitable for delineating the second contour. Conversely, if the quantity of the first inflection points and the second inflection points in the reference image MR is not smaller than the preset quantity and the distance between every two of the first inflection points and the second inflection points does not exceed the preset distance, the projection apparatus 200 may determine, for example, that the first inflection points and the second inflection points are suitable for delineating the second contour, but this does not constitute any limitation on the invention.

In the third embodiment, when it is determined that the first inflection point in the first image M1 and the second inflection point in the second image M2 are suitable for delineating the second contour, the projection apparatus 200 may control, through the processor 204, the module stored in the storage circuit 201 to delineate the second contour based on the first inflection point in the first image M1 and the second inflection point in the second image M2. For example, the projection apparatus 200 may connect every two adjacent points in the inflection points MR1 shown in the reference image MR to form a closed line segment C1, and use the closed line segment C1 as the second contour, as shown in FIG. 3C, but this does not constitute any limitation.

In the third embodiment, after delineating the second contour, the projection apparatus 200 may determine, through the processor 204, whether an acknowledgement command or non-acknowledgement command is received. Similar to what is mentioned above, after the projection apparatus 200 delineates the second contour, the projection apparatus 200 may render the second contour to the user for viewing, and simultaneously provide a dialog box asking the user to check whether the second contour matches the region contour of the non-planar region 199a. In this case, the acknowledgement command may be, for example, generated by operating the dialog box after the user visually confirms that the second contour matches the region contour of the non-planar region 199a. In addition, if the user visually confirms that the second contour does not match the region contour of the non-planar region 199a, the user may also generate the non-acknowledgement command by operating the dialog box, but this does not constitute any limitation.

In addition, in the first embodiment, the first pattern 310 may also directly include a plurality of first straight lines 311 and a plurality of second straight lines 331, and one of the second straight lines 331 is not parallel to one of the first straight lines 311. For example, the first pattern 310 may include a checkerboard pattern formed by the first straight lines 311 and the second straight lines 331, or the first pattern 310 may include two non-parallel straight lines crossing each other. In this way, by referring to the mechanism of finding the first specific line segment in the first image M1, the second specific line segment (341-345 marked in FIG. 3B) that includes the second inflection points (for example, 342a and 342b marked in FIG. 3B) may be found in the first image M1 by controlling, through the processor 204, the module stored in the storage circuit 201. When it is determined that the first inflection points and the second inflection points in the first image M1 are suitable for delineating the first contour, the processor 204 controls the module stored in the storage circuit 201 to delineate the first contour based on the first inflection points and the second inflection points in the first image M1. This method includes two straight line patterns in which the straight lines are not parallel to each other. Therefore, the quantity of inflection points for delineating the contour is increased, and it is easier to achieve the purpose of delineating the contour that matches the region contour of the non-planar region 199a.

In the third embodiment, when the projection apparatus 200 determines, through the processor 204, that an acknowledgement command is received, it may be determined that the second contour matches the region contour of the non-planar region 199a. Subsequently, as shown in FIG. 3C, the projection apparatus 200 may control, through the processor 204, the module stored in the storage circuit 201 to generate a corresponding mask pattern MK (the second mask pattern) based on the second contour. The mask pattern MK may be configured to mask the outer region of the second contour. In other words, an unmasked region MK1 in the mask pattern MK corresponds to the non-planar region 199a. Subsequently, the projection apparatus 200 may control, through the processor 204, the module stored in the storage circuit 201 to obtain projection content, and mask the projection content by using the mask pattern MK. In this case, other than the part corresponding to the non-planar region 199a, all the remaining part of the masked projection content is masked. Correspondingly, the projection apparatus 200 may project the masked projection content onto the projection surface 199. As can be seen from the foregoing, in the third embodiment, after projecting different patterns onto the projection surface, the projection apparatus 200 in the invention can delineate the region contour of the non-planar region 199*a* by integrating the corresponding inflection points of each pattern, and generate the corresponding mask pattern.

In other words, if the projection apparatus 200 cannot delineate the region contour of the non-planar region 199*a* based on only the corresponding inflection points of a single pattern, the projection apparatus 200 can still, after projecting another pattern onto the projection surface, integrate the corresponding inflection points of the two patterns to delineate the region contour of the non-planar region 199*a* and further adaptively generate a suitable mask pattern.

In addition, in the third embodiment, assuming that the user visually determines that the second contour delineated based on the first inflection point and the second inflection point does not match the non-planar region 199*a*, and operates the dialog box correspondingly, the projection apparatus 200 may determine, according to the received non-acknowledgement command, that the second contour does not match the region contour of the non-planar region 199*a*. In this case, the projection apparatus 200 may further project one or more other patterns in an attempt to construct/delineate the contour of the non-planar region 199*a* and generate a corresponding mask pattern.

For example, in a fourth embodiment, the projection apparatus 200 may control the projection circuit 202 through the processor 204 to project a third pattern (not shown) onto the projection surface 199. The third pattern may include a plurality of third straight lines. Each third straight line is parallel to each first straight line 311. A first spacing between the first straight lines 311 is greater than a third spacing between the third straight lines. That is, a density of the third straight lines in the third pattern is higher than a density of the first straight lines 311 in the first pattern 310.

Subsequently, the projection apparatus 200 may control the imaging circuit 203 through the processor 204 to shoot a third image (not shown) of the projection surface 199 on which the third pattern is rendered, and find at least one third specific line segment in the third image. Each third specific line segment includes at least one third inflection point. In the fourth embodiment, the projection apparatus 200 may control, through the processor 204, the module stored in the storage circuit 201 to find, in the way mentioned above, at least one third specific line segment with an inflection point in the third image, the details of which are omitted herein.

In addition, the projection apparatus 200 may control the projection circuit 202 through the processor 204 to project a fourth pattern (not shown) onto the projection surface 199. The fourth pattern includes a plurality of fourth straight lines. Each fourth straight line is parallel to each second straight line 331. A second spacing between the second straight lines 331 is greater than a fourth spacing between the fourth straight lines. That is, a density of the fourth straight lines in the fourth pattern is higher than the density of the second straight lines 331 in the second pattern 330.

Subsequently, the projection apparatus 200 may control the imaging circuit 203 through the processor 204 to shoot a fourth image (not shown) of the projection surface 199 on which the fourth pattern is rendered, and find at least one fourth specific line segment in the fourth image. Each fourth specific line segment includes at least one fourth inflection point. In the fourth embodiment, the projection apparatus 200 may control, through the processor 204, the module stored in the storage circuit 201 to find, in the way mentioned above, at least one fourth specific line segment with an inflection point in the fourth image, the details of which are omitted herein.

Subsequently, the projection apparatus 200 may determine whether the third inflection point in the third image and the fourth inflection point in the fourth image are suitable for delineating a third contour. For example, the projection apparatus 200 may determine whether a total quantity of the third inflection points and the fourth inflection points is greater than a preset quantity and/or whether a distance between every two of the third inflection points and the fourth inflection points is less than a preset distance, but this does not constitute any limitation.

When it is determined that the third inflection points in the third image and the fourth inflection points in the fourth image are suitable for delineating the third contour, the projection apparatus 200 may control, through the processor 204, the module stored in the storage circuit 201 to delineate the third contour based on the third inflection points in the third image and the fourth inflection points in the fourth image. The related method may be obtained by referring to the related description about FIG. 3C, and the details thereof are omitted herein.

Subsequently, similar to the third embodiment, the projection apparatus 200 may determine, based on an acknowledgement command or non-acknowledgement command from the user, whether the third contour matches the region contour of the non-planar region 199*a*. The related details may be obtained by referring to the description in the third embodiment, and are omitted herein.

In the fourth embodiment, in a case of determining that the third contour matches the region contour of the non-planar region 199*a*, the projection apparatus 200 may control, through the processor 204, the module stored in the storage circuit 201 to generate a third mask pattern based on the third contour. The third mask pattern is configured to mask an outer region of the third contour. In other words, an unmasked region in the third mask pattern corresponds to the non-planar region 199*a*. Subsequently, the projection apparatus 200 may control, through the processor 204, the module stored in the storage circuit 201 to obtain projection content, and mask the projection content by using the third mask pattern. In this case, other than the part corresponding to the non-planar region 199*a*, all the remaining part of the masked projection content is masked. Correspondingly, the projection apparatus 200 may project the masked projection content onto the projection surface 199.

As can be seen from the foregoing, in the fourth embodiment, if the second contour delineated by the projection apparatus 200 based on the corresponding inflection points of the lower-density first and second patterns does not match the region contour of the non-planar region 199*a*, the projection apparatus 200 in the invention may further project the higher-density third and fourth patterns, so as to delineate a third contour that better matches the region contour of the non-planar region 199*a*, and generate a third mask pattern accordingly.

In addition, in the fourth embodiment, if the third contour still does not match the region contour of the non-planar region 199*a*, the projection apparatus 200 may further project one or more other patterns that have higher densities, and thus delineate another contour that better matches the region contour of the non-planar region 199*a* and generate a corresponding mask pattern accordingly, but this does not constitute any limitation.

Furthermore, even in the face of a non-planar region that has a more complex contour, the projection apparatus 200 in the invention may adaptively generate a suitable mask pattern by projecting a denser pattern, so that the unmasked region in the projection content can be correctly rendered in the non-planar region.

In addition, in a fifth embodiment, if the projection apparatus 200 determines in the second embodiment that the first inflection points 321a-323b are not suitable for delineating the first contour, or that the delineated first contour does not match the region contour of the non-planar region 199a, then the projection apparatus 200 may control the projection circuit 202 through the processor 204 to project a fifth pattern (not shown) onto the projection surface 199. The fifth pattern may include multiple fifth straight lines. Each fifth straight line is parallel to each first straight line 311, and the first spacing between the first straight lines 311 is greater than a fifth spacing between the fifth straight lines. That is, a density of the fifth straight lines in the fifth pattern is higher than the density of the first straight lines 311 in the first pattern 310.

Subsequently, the projection apparatus 200 may control the imaging circuit 203 through the processor 204 to shoot a fifth image (not shown) of the projection surface 199 on which the fifth pattern is rendered, and find at least one fifth specific line segment in the fifth image. Each fifth specific line segment includes at least one fifth inflection point. In the fifth embodiment, the projection apparatus 200 may control, through the processor 204, the module stored in the storage circuit 201 to find, in the way mentioned above, at least one fifth specific line segment with an inflection point in the fifth image, the details of which are omitted herein.

Subsequently, the projection apparatus 200 may determine whether the fifth inflection points in the fifth image are suitable for delineating the fourth contour. For example, the projection apparatus 200 may determine whether the quantity of the fifth inflection points is greater than a preset quantity and/or whether a distance between every two of the fifth inflection points is less than a preset distance, but this does not constitute any limitation.

When it is determined that the fifth inflection points in the fifth image are suitable for delineating the fourth contour, the projection apparatus 200 may control, through the processor 204, the module stored in the storage circuit 201 to delineate the fourth contour based on the fifth inflection points in the fifth image. The related method may be obtained by referring to the related description about FIG. 3C, and the details thereof are omitted herein.

Subsequently, similar to the third embodiment, the projection apparatus 200 may determine, based on an acknowledgement command or non-acknowledgement command from the user, whether the fourth contour matches the region contour of the non-planar region 199a. The related details may be obtained by referring to the description in the third embodiment, and are omitted herein.

In the fifth embodiment, in a case of determining that the fourth contour matches the region contour of the non-planar region 199a, the projection apparatus 200 may control, through the processor 204, the module stored in the storage circuit 201 to generate a fourth mask pattern based on the fourth contour. The fourth mask pattern is configured to mask an outer region of the fourth contour. In other words, an unmasked region in the fourth mask pattern corresponds to the non-planar region 199a. Subsequently, the projection apparatus 200 may control, through the processor 204, the module stored in the storage circuit 201 to obtain projection content, and mask the projection content by using the fourth mask pattern. In this case, other than the part corresponding to the non-planar region 199a, all the remaining part of the masked projection content is to be masked. Correspondingly, the projection apparatus 200 may project the masked projection content onto the projection surface 199.

As can be seen from the foregoing, in the fifth embodiment, if the first contour delineated by the projection apparatus 200 based on the corresponding inflection points of the lower-density first pattern does not match the region contour of the non-planar region 199a, the projection apparatus 200 in the invention may further project the higher-density fifth pattern, so as to delineate a fourth contour that better matches the region contour of the non-planar region 199a, and generate a fourth mask pattern accordingly.

Understandably, in other embodiments, the projection apparatus in the invention may generate suitable mask patterns corresponding to non-planar regions that each has a different region contour, without being limited to the non-planar region 199a mentioned in the above embodiment. In addition, the non-planar region 199a is assumed to be a convex surface in the above embodiment. However, in other embodiments, the projection apparatus 200 in the invention can still adaptively generate a suitable mask pattern automatically for other non-planar regions that have a concave surface or both a concave surface and a convex surface.

In addition, in other embodiments, the pattern projected by the projection apparatus 200 onto the projection surface is not limited to the forms mentioned in the above embodiment. In different embodiments, depending on requirements, a designer may adjust the pattern in use to other forms, such as but not limited to various crisscross straight lines.

Figure 4:
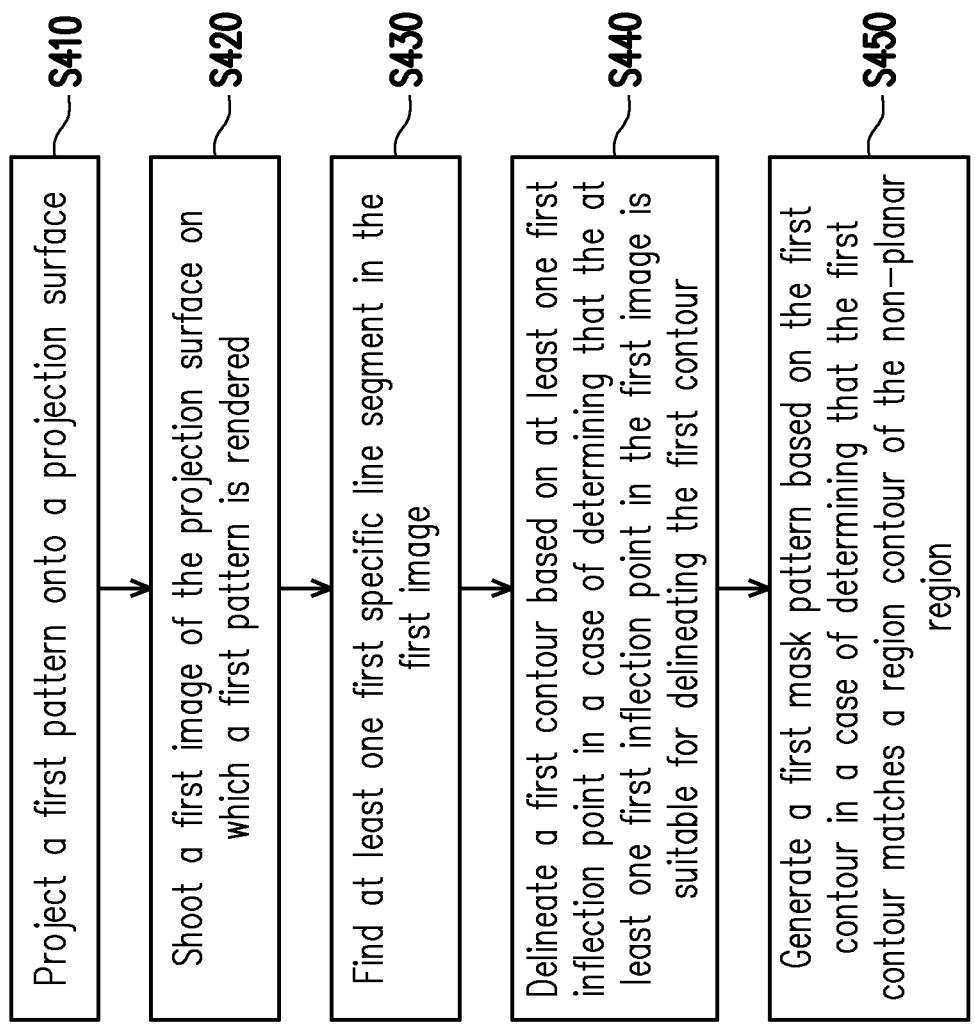
FIG. 4 is a flowchart of a method for generating a mask according to an embodiment of the invention.

Refer to FIG. 4, which is a flowchart of a method for generating a mask according to an embodiment of the invention. In this embodiment, a processor 204 of a projection apparatus 200 may implement the method in FIG. 4 by accessing modules and code recorded in a storage circuit 201. The following describes the steps in FIG. 4 with reference to FIG. 2.

First, in step S410, the processor 204 may control the projection circuit 202 to project a first pattern 310 onto a projection surface 199. In step S420, the processor 204 may control an imaging circuit 203 to shoot a first image M1 of the projection surface 199 on which a first pattern 310 is rendered. In step S430, the processor 204 may find at least one first specific line segment 321-323 in the first image M1. In step S440, the processor 204 may delineate a first contour based on at least one first inflection point 321a-323b in a case of determining that the at least one first inflection point 321a-323b in the first image M1 is suitable for delineating the first contour. In step S450, the processor 204 may generate a first mask pattern based on the first contour in a case of determining that the first contour matches a region contour of the non-planar region 199a. Details of the above steps may be obtained by referring to the description in the preceding embodiments, and are omitted herein.

Based on the foregoing, according to the method and the projection apparatus in the invention, after one or more patterns are projected onto the projection surface that includes a non-planar region, the contour corresponding to the region contour of the non-planar region can be delineated based on the inflection points that are of the patterns and caused by the non-planar region, and the corresponding mask pattern is generated accordingly. The mask pattern may be configured to mask the outer region of the contour. That is, the projection apparatus in the invention can adaptively generate a corresponding mask pattern according to the region contour of the non-planar region, so that an unmasked region in the projection content can be correctly rendered in the non-planar region.

The foregoing descriptions are merely exemplary embodiments of the invention, and are not intended to limit the scope of implementation of the invention. To be specific, any simple equivalent changes and modifications made according to the claims and the specification of the invention shall still fall within the patent scope of the invention. Moreover, any embodiment or claim of the invention is unnecessarily to achieve all the objectives, advantages or features disclosed in the invention. In addition, the abstract of the specification and the title of the invention are used only to help with patent document retrieval, and are not intended to limit the scope of the claims of the invention. In addition, the terms "first", "second", and the like mentioned in the specification or the claims are used only to name elements or to distinguish between different embodiments or ranges, but are not intended to define the upper or lower limit of the number of elements.

The foregoing description of the exemplary embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable a person skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by a person skilled in the art without departing from the scope of the invention as defined by the following claims. Moreover, no element and component in the present disclosure is intended to be dedicated to the public regardless of whether the element or component is explicitly recited in the following claims.

What is claimed is:

1. A method for generating a mask, applied to a projection apparatus, the method for generating the mask comprising:
    projecting a first pattern onto a projection surface, wherein the projection surface comprises a non-planar region, and the first pattern comprises a plurality of first straight lines;
    shooting a first image of the projection surface on which the first pattern is rendered;
    finding at least one first specific line segment in the first image, wherein each first specific line segment comprises at least one first inflection point;
    delineating a first contour based on the at least one first inflection point in a case of determining that the at least one first inflection point in the first image is suitable for delineating the first contour; and
    generating a first mask pattern based on the first contour in a case of determining that the first contour matches a region contour of the non-planar region, wherein the first mask pattern is configured to mask an outer region of the first contour.

2. The method for generating the mask according to claim 1, wherein in a case of determining that the at least one first inflection point in the first image is not suitable for delineating the first contour or in a case of determining that the first contour does not match the region contour of the non-planar region, the method for generating the mask further comprises:
    projecting a second pattern onto the projection surface, wherein the second pattern comprises a plurality of second straight lines, wherein one of the plurality of second straight lines is not parallel to one of the plurality of first straight lines;
    shooting a second image of the projection surface on which the second pattern is rendered;
    finding at least one second specific line segment in the second image, wherein each second specific line segment comprises at least one second inflection point;
    delineating a second contour based on the at least one first inflection point in the first image and the at least one second inflection point in the second image in a case of determining that the at least one first inflection point in the first image and the at least one second inflection point in the second image are suitable for delineating the second contour; and
    generating a second mask pattern based on the second contour in a case of determining that the second contour matches the region contour of the non-planar region, wherein the second mask pattern is configured to mask an outer region of the second contour.

3. The method for generating the mask according to claim 2, wherein a first spacing exists between the plurality of first straight lines, a second spacing exists between the plurality of second straight lines, and in a case of determining that the second contour does not match the region contour of the non-planar region, the method for generating the mask further comprises:
    projecting a third pattern onto the projection surface, wherein the third pattern comprises a plurality of third straight lines, each of the third straight lines is parallel to each of the first straight lines, and the first spacing between the plurality of first straight lines is greater than a third spacing between the plurality of third straight lines;
    shooting a third image of the projection surface on which the third pattern is rendered;
    finding at least one third specific line segment in the third image, wherein each third specific line segment comprises at least one third inflection point;
    projecting a fourth pattern onto the projection surface, wherein the fourth pattern comprises a plurality of fourth straight lines, wherein each of the fourth straight lines is parallel to each of the second straight lines, and the second spacing between the plurality of second straight lines is greater than a fourth spacing between the plurality of fourth straight lines;

shooting a fourth image of the projection surface on which the fourth pattern is rendered;

finding at least one fourth specific line segment in the fourth image, wherein each fourth specific line segment comprises at least one fourth inflection point;

delineating a third contour based on the at least one third inflection point in the third image and the at least one fourth inflection point in the fourth image in a case of determining that the at least one third inflection point in the third image and the at least one fourth inflection point in the fourth image are suitable for delineating the third contour; and generating a third mask pattern based on the third contour in a case of determining that the third contour matches the region contour of the non-planar region, wherein the third mask pattern is configured to mask an outer region of the third contour.

4. The method for generating the mask according to claim 1, wherein the first pattern further comprises a plurality of second straight lines, wherein one of the plurality of second straight lines is not parallel to one of the plurality of first straight lines, and the method for generating the mask further comprises:

finding at least one second specific line segment in the first image, wherein each second specific line segment comprises at least one second inflection point; and delineating the first contour based on the at least one first inflection point and the at least one second inflection point in the first image in a case of determining that the at least one first inflection point and the at least one second inflection point in the first image are suitable for delineating the first contour.

5. The method for generating the mask according to claim 1, wherein a quantity of the at least one first inflection point is at least three, and the step of delineating the first contour based on the at least one first inflection point comprises:

connecting every two adjacent inflection points in the at least three first inflection points to form a closed line segment, and using the closed line segment as the first contour.

6. The method for generating the mask according to claim 1, wherein after delineating the first contour based on the at least one first inflection point in the first image, the method for generating the mask further comprises:

determining, in a case of determining receipt of an acknowledgment command, that the first contour matches the region contour of the non-planar region; or determining, in a case of determining receipt of a non-acknowledgement command, that the first contour does not match the region contour of the non-planar region.

7. The method for generating the mask according to claim 1, wherein each of the first straight lines has a first preset slope, the each first specific line segment comprises a specific slope, and the specific slope is different from the first preset slope.

8. The method for generating the mask according to claim 7, wherein a plurality of reference line segments corresponding to the plurality of first straight lines exist in the first image, and the step of finding the at least one first specific line segment in the first image comprises:

determining, in a case of determining that at least one reference inflection point exists on an $i^{th}$ reference line segment in the plurality of reference line segments, whether the at least one reference inflection point exists on an $(i-1)^{th}$ reference line segment or an $(i+1)^{th}$ reference line segment in the plurality of reference line segments, wherein a reference slope comprised by each of the plurality of reference line segments is different from the first preset slope, and i is an index value of the plurality of reference line segments;

determining, in a case of determining that at least one reference inflection point exists on the $(i-1)^{th}$ reference line segment or the $(i+1)^{th}$ reference line segment in the plurality of reference line segments, that the $i^{th}$ reference line segment belongs to the at least one first specific line segment, and determining that the at least one reference inflection point on the $i^{th}$ reference line segment belongs to the at least one first inflection point; or determining, in a case of determining that no reference inflection point exists on the $(i-1)^{th}$ reference line segment and the $(i+1)^{th}$ reference line segment in the plurality of reference line segments, that the $i^{th}$ reference line segment does not belong to the at least one first specific line segment, and determining that the at least one reference inflection point on the $i^{th}$ reference line segment does not belong to the at least one first inflection point.

9. The method for generating the mask according to claim 1, wherein each of the first straight lines has a first preset curvature, the each first specific line segment comprises a specific curvature, and the specific curvature is different from the first preset curvature.

10. The method for generating the mask according to claim 1, further comprising:

obtaining projection content, and masking the projection content using the first mask pattern; and projecting the masked projection content onto the projection surface.

11. The method for generating the mask according to claim 1, wherein in a case of determining that the at least one first inflection point in the first image is not suitable for delineating the first contour or in a case of determining that the first contour does not match the region contour of the non-planar region, the method for generating the mask further comprises:

projecting a fifth pattern onto the projection surface, wherein the fifth pattern comprises a plurality of fifth straight lines, wherein each of the fifth straight lines is parallel to each of the first straight lines, and a first spacing between the plurality of first straight lines is greater than a fifth spacing between the plurality of fifth straight lines;

shooting a fifth image of the projection surface on which the fifth pattern is rendered;

finding at least one fifth specific line segment in the fifth image, wherein each fifth specific line segment comprises at least one fifth inflection point;

delineating a fourth contour based on the at least one fifth inflection point in the fifth image in a case of determining that the at least one fifth inflection point in the fifth image is suitable for delineating the fourth contour; and generating a fourth mask pattern based on the fourth contour in a case of determining that the fourth contour matches the region contour of the non-planar region, wherein the fourth mask pattern is configured to mask an outer region of the fourth contour.

12. A projection apparatus, comprising a storage circuit, a projection circuit, an imaging circuit, and a processor, wherein the storage circuit stores a plurality of modules; and the processor is coupled to the storage circuit, the projection circuit, and the imaging circuit, and accesses the plurality of modules, wherein:

the processor controls the projection circuit to project a first pattern onto a projection surface, wherein the projection surface comprises a non-planar region, and the first pattern comprises a plurality of first straight lines;

the processor controls the imaging circuit to shoot a first image of the projection surface on which the first pattern is rendered;

the processor controls the plurality of modules to find at least one first specific line segment in the first image, wherein each first specific line segment comprises at least one first inflection point;

the processor controls the plurality of modules to delineate a first contour based on the at least one first inflection point in a case of determining that the at least one first inflection point in the first image is suitable for delineating the first contour; and the processor controls the plurality of modules to generate a first mask pattern based on the first contour in a case of determining that the first contour matches a region contour of the non-planar region, wherein the first mask pattern is configured to mask an outer region of the first contour.

13. The projection apparatus according to claim 12, wherein in a case of determining that the at least one first inflection point in the first image is not suitable for delineating the first contour or in a case of determining that the first contour does not match the region contour of the non-planar region:

the processor controls the projection circuit to project a second pattern onto the projection surface, wherein the second pattern comprises a plurality of second straight lines, wherein one of the plurality of second straight lines is not parallel to one of the plurality of first straight lines;

the processor controls the imaging circuit to shoot a second image of the projection surface on which the second pattern is rendered;

the processor controls the plurality of modules to find at least one second specific line segment in the second image, wherein each second specific line segment comprises at least one second inflection point;

the processor controls the plurality of modules to delineate a second contour based on the at least one first inflection point in the first image and the at least one second inflection point in the second image in a case of determining that the at least one first inflection point in the first image and the at least one second inflection point in the second image are suitable for delineating the second contour; and the processor controls the plurality of modules to generate a second mask pattern based on the second contour in a case of determining that the second contour matches the region contour of the non-planar region, wherein the second mask pattern is configured to mask an outer region of the second contour.

14. The projection apparatus according to claim 13, wherein a first spacing exists between the plurality of first straight lines, a second spacing exists between the plurality of second straight lines, and in a case of determining that the second contour does not match the region contour of the non-planar region:

the processor controls the projection circuit to project a third pattern onto the projection surface, wherein the third pattern comprises a plurality of third straight lines, wherein each of the third straight lines is parallel to each of the first straight lines, and the first spacing between the plurality of first straight lines is greater than a third spacing between the plurality of third straight lines;

the processor controls the imaging circuit to shoot a third image of the projection surface on which the third pattern is rendered;

the processor controls the plurality of modules to find at least one third specific line segment in the third image, wherein each third specific line segment comprises at least one third inflection point;

the processor controls the projection circuit to project a fourth pattern onto the projection surface, wherein the fourth pattern comprises a plurality of fourth straight lines, wherein each of the fourth straight lines is parallel to each of the second straight lines, and the second spacing between the plurality of second straight lines is greater than a fourth spacing between the plurality of fourth straight lines;

the processor controls the imaging circuit to shoot a fourth image of the projection surface on which the fourth pattern is rendered;

the processor controls the plurality of modules to find at least one fourth specific line segment in the fourth image, wherein each fourth specific line segment comprises at least one fourth inflection point;

the processor controls the plurality of modules to delineate a third contour based on the at least one third inflection point in the third image and the at least one fourth inflection point in the fourth image in a case of determining that the at least one third inflection point in the third image and the at least one fourth inflection point in the fourth image are suitable for delineating the third contour; and the processor controls the plurality of modules to generate a third mask pattern based on the third contour in a case of determining that the third contour matches the region contour of the non-planar region, wherein the third mask pattern is configured to mask an outer region of the third contour.

15. The projection apparatus according to claim 12, wherein the first pattern further comprises a plurality of second straight lines, wherein one of the plurality of second straight lines is not parallel to one of the plurality of first straight lines, wherein:

the processor controls the plurality of modules to find at least one second specific line segment in the first image, wherein each second specific line segment comprises at least one second inflection point; and the processor controls the plurality of modules to delineate the first contour based on the at least one first inflection point and the at least one second inflection point in the first image in a case of determining that the at least one first inflection point and the at least one second inflection point in the first image are suitable for delineating the first contour.

16. The projection apparatus according to claim 12, wherein a quantity of the at least one first inflection point is at least three, wherein the processor controls the plurality of modules to connect every two adjacent inflection points in the at least three first inflection points to form a closed line segment, and use the closed line segment as the first contour.

17. The projection apparatus according to claim 12, wherein after delineating the first contour based on the at least one first inflection point in the first image:

in a case of determining receipt of an acknowledgment command, the processor determines that the first contour matches the region contour of the non-planar region; or in a case of determining receipt of a non-acknowledgement command, the processor determines that the first contour does not match the region contour of the non-planar region.

18. The projection apparatus according to claim 13, wherein each of the first straight lines has a first preset slope, the each first specific line segment comprises a specific slope, and the specific slope is different from the first preset slope.

19. The projection apparatus according to claim 18, wherein a plurality of reference line segments corresponding to the plurality of first straight lines exist in the first image, wherein:

in a case that the processor controls the plurality of modules to determine that at least one reference inflection point exists on an $i^{th}$ reference line segment in the plurality of reference line segments, the processor controls the plurality of modules to determine whether the at least one reference inflection point exists on an $(i-1)^{th}$ reference line segment or an $(i+1)^{th}$ reference line segment in the plurality of reference line segments, wherein a reference slope comprised by each of the plurality of reference line segments is different from the first preset slope, and i is an index value of the plurality of reference line segments;

in a case that the processor controls the plurality of modules to determine that at least one reference inflection point exists on the $(i-1)^{th}$ reference line segment or the $(i+1)^{th}$ reference line segment in the plurality of reference line segments, the $i^{th}$ reference line segment is determined as belonging to the at least one first specific line segment, and the at least one reference inflection point on the $i^{th}$ reference line segment is determined as belonging to the at least one first inflection point; or in a case that the processor controls the plurality of modules to determine that no reference inflection point exists on the $(i-1)^{th}$ reference line segment and the $(i+1)^{th}$ reference line segment in the plurality of reference line segments, the $i^{th}$ reference line segment is determined as not belonging to the at least one first specific line segment, and the at least one reference inflection point on the $i^{th}$ reference line segment is determined as not belonging to the at least one first inflection point.

20. The projection apparatus according to claim 12, wherein each of the first straight lines has a first preset curvature, the each first specific line segment comprises a specific curvature, and the specific curvature is different from the first preset curvature.

21. The projection apparatus according to claim 12, wherein the processor controls the plurality of modules to obtain projection content, and mask the projection content using the first mask pattern; and the processor controls the projection circuit to project the masked projection content onto the projection surface.

22. The projection apparatus according to claim 12, wherein in a case of determining that the at least one first inflection point in the first image is not suitable for delineating the first contour or in a case of determining that the first contour does not match the region contour of the non-planar region:

the processor controls the projection circuit to project a fifth pattern onto the projection surface, wherein the fifth pattern comprises a plurality of fifth straight lines, each of the fifth straight lines is parallel to each of the first straight lines, and a first spacing between the plurality of first straight lines is greater than a fifth spacing between the plurality of fifth straight lines;

the processor controls the imaging circuit to shoot a fifth image of the projection surface on which the fifth pattern is rendered; and find at least one fifth specific line segment in the fifth image, wherein each fifth specific line segment comprises at least one fifth inflection point;

the processor controls the plurality of modules to delineate a fourth contour based on the at least one fifth inflection point in the fifth image in a case of determining that the at least one fifth inflection point in the fifth image is suitable for delineating the fourth contour; and the processor controls the plurality of modules to generate a fourth mask pattern based on the fourth contour in a case of determining that the fourth contour matches the region contour of the non-planar region, wherein the fourth mask pattern is configured to mask an outer region of the fourth contour.

\* \* \* \* \*